United States Patent
Li et al.

(10) Patent No.: US 9,436,013 B2
(45) Date of Patent: Sep. 6, 2016

(54) REFLECTIVE TYPE NAKED-EYE 3D DISPLAY APPARATUS AND MANUFACTURING METHOD THEREOF

(71) Applicant: BOE TECHNOLOGY GROUP CO., LTD., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 239 days.

(21) Appl. No.: 14/127,305

(22) PCT Filed: Dec. 13, 2012

(86) PCT No.: PCT/CN2012/086496
§ 371 (c)(1),
(2) Date: Dec. 18, 2013

(87) PCT Pub. No.: WO2014/015623
PCT Pub. Date: Jan. 30, 2014

(65) Prior Publication Data
US 2015/0219907 A1    Aug. 6, 2015

(30) Foreign Application Priority Data
Jul. 27, 2012 (CN) .......................... 2012 1 0265387

(51) Int. Cl.
G02F 1/1335 (2006.01)
G02B 27/22 (2006.01)
G02B 27/26 (2006.01)
G02F 1/1347 (2006.01)
G02F 1/13363 (2006.01)
G02F 1/137 (2006.01)

(52) U.S. Cl.
CPC ............... *G02B 27/22* (2013.01); *G02B 27/26* (2013.01); *G02F 1/137* (2013.01);

(Continued)

(58) Field of Classification Search
USPC .......................................... 349/15
See application file for complete search history.

(56) References Cited

U.S. PATENT DOCUMENTS 4,097,130 A * 6/1978 Cole, Jr. .......................... 349/79
5,990,995 A * 11/1999 Ebihara et al. ............... 349/113
(Continued)

FOREIGN PATENT DOCUMENTS

CN       102809848 A      12/2012
JP       2005173303 A  *   6/2005    ............. G02B 27/22

OTHER PUBLICATIONS

International Preliminary Report on Patentability for International Application No. PCT/CN2012/086496 dated Jan. 27, 2015, nine (9) pages.

(Continued)

Primary Examiner — Hoan C Nguyen
(74) Attorney, Agent, or Firm — Ladas & Parry LLP

(57) ABSTRACT

A reflective type naked-eye 3D display apparatus and manufacturing method thereof are disclosed and the reflective type naked-eye 3D display apparatus comprises: a liquid crystal display panel (2). The reflective type naked-eye 3D display apparatus further comprises: a polarizing filter structure (1) disposed on the liquid crystal display panel (2), the polarizing filter structure (1) may comprise different regions where linear polarizing lights having different polarizing states are transmitted; a reflective layer structure (3) disposed under the liquid crystal display panel (2), the reflective layer structure (3) may comprise different regions where linear polarizing light of a preset direction is reflected or transmitted. The reflective type naked-eye 3D display apparatus can achieve a naked-eye type 3D displaying on the reflective type liquid crystal display panel.

17 Claims, 7 Drawing Sheets

(52) U.S. Cl.
CPC ...... *G02F 1/13363* (2013.01); *G02F 1/13475* (2013.01); *G02F 1/133512* (2013.01); *G02F 1/133528* (2013.01); *G02F 1/133553* (2013.01); *G02B 27/2214* (2013.01); *G02F 2001/133638* (2013.01)

(56) References Cited

U.S. PATENT DOCUMENTS

| | | | | |
|---|---|---|---|---|
| 2008/0013003 | A1* | 1/2008 | Soh | 349/15 |
| 2009/0153651 | A1* | 6/2009 | Verhaegh et al. | 348/54 |
| 2013/0107533 | A1* | 5/2013 | Wu et al. | 362/253 |

OTHER PUBLICATIONS

International Search Report (Chinese language) issued by the State Intellectual Property Office ("SIPO") on Apr. 25, 2013 for PCT/CN2012/086496, 14 pages.
English abstract of Chinese language reference for CN 102809848A, listed above in Foreign Patents Documents section, 2 pages.
English abstract of CN 101556410A, 2 pages.
English abstract of CN 1338656A, 1 page.
English abstract of CN 101257639A, 2 pages.
English abstract of JP 2000227606A, 2 pages.

* cited by examiner

REFLECTIVE TYPE NAKED-EYE 3D DISPLAY APPARATUS AND MANUFACTURING METHOD THEREOF

CROSS REFERENCE TO RELATED APPLICATIONS

This application is based on International Application No. PCT/CN2012/086496 filed on Dec. 13, 2012, which claims priority to Chinese National Application No. 201210265387.4 filed on Jul. 27, 2012, the contents of which are incorporated herein by reference.

TECHNICAL FIELD

The present invention relates to a reflective type naked-eye 3D display apparatus and manufacturing method thereof.

BACKGROUND

As is well known, a 2D display, which is commonly seen by people, can not provide information regarding depth of field like the real world. The key reason why people can distinguish the depth of field (3D effect) is that two eyes of a human have a position difference produced by a pupil distance of about 60 mm. Two pictures having "binocular parallax" become a pair of "stereoscopic pictures", and it produces a stereoscopic effect through the combination of cerebral visual cortex of the human.

3D displaying modes are classified as a naked-eye type 3D displaying mode and a glasses type 3D displaying mode. Currently, the mainstream technologies of the glasses type 3D displaying mode has a shutter glass technology and a pattern retard technology; while the naked-eye type 3D displaying mode mainly has technologies such as parallax barrier grating, lenticular lens grating and so on. Among the naked-eye type 3D displaying mode, the technology of parallax barrier grating is most maturely applied, and ruling film type, black matrix (BM) type, reflective BM type, active barrier type, etc. can be used as grating materials.

However, the above 3D displaying modes are only suitable for a transmissive type liquid crystal display panel, and it is hard for a reflective liquid crystal display panel to achieve 3D displaying, since light source used by the reflective liquid crystal display panel is environment light, and the light path is relatively complex. If a grating is disposed on the reflective liquid crystal display panel, it may directly hinder the direction of the incident light, and influence picture displaying and 3D implementation.

SUMMARY

Embodiments of the present invention provide the following technical solutions.

On one aspect, there is provided a reflective type naked-eye 3D display apparatus, comprising:
a liquid crystal display panel;
the reflective type 3D display apparatus further comprises:
a polarizing filter structure disposed on the liquid crystal display panel, the polarizing filter structure may comprise different regions where linear polarizing lights of different polarizing states are transmitted;
a reflective layer structure disposed under the liquid crystal display panel, the reflective layer structure may comprise different regions where linear polarizing light of a preset direction is reflected or transmitted.

Further, the reflective type naked-eye 3D display apparatus further comprises:
a light absorbing layer disposed under the reflective layer structure.

Further, the light absorbing layer comprises black organic material, black inorganic material or black metal.

Further, the polarizing filter structure comprises:
a first substrate and a second substrate disposed to be opposite to each other;
liquid crystal molecules between the first substrate and the second substrate and formed of Nematic phase liquid crystal and dichromatism dye, the original orientation of the liquid crystal molecules is parallel to the first substrate, and after applying an electric field to the polarizing filter structure, the orientation of the liquid crystal molecules is vertical to the first substrate.

Further, the polarizing filter structure comprises at least one first region and at least one second region, and each sub pixel comprises one first region and one second region, and the orientation of the liquid crystal molecules of the first region is parallel to the first substrate, and the orientation of the liquid crystal molecules of the second region is vertical to the first substrate.

Further, the reflective layer structure comprises at least one third region and at least one fourth region, and each sub pixel comprises one third region and one fourth region, and the third region of the reflective layer structure is constituted by a ¼ wave plate and a reflective plate; the reflective layer structure of the fourth region may reflect the linear polarizing light of the preset direction and transmit the linear polarizing light perpendicular to the preset direction.

Further, the reflective layer structure of the fourth region comprises a nano-scale wire grid polarizer; or
the reflective layer structure of the fourth region comprises a cholesteric phase liquid crystal display panel; or
the reflective layer structure of the fourth region comprises a 3M selectively reflective film.

An embodiment of the present invention further provides a manufacturing method of manufacturing the above reflective naked-eye 3D display apparatus, comprising:
forming a liquid crystal display panel;
the manufacturing method further comprises:
forming a polarizing filter structure on the liquid crystal display panel, the polarizing filter structure may comprise different regions where linear polarizing lights of different polarizing states are transmitted;
forming a reflective layer structure under the liquid crystal display panel, the reflective layer structure may comprise different regions and linear polarizing light of a preset direction is reflected.

Further, the manufacturing method further comprises:
forming a light absorbing layer under the reflective layer structure.

BRIEF DESCRIPTION OF THE DRAWINGS

In order to clearly describe the technical solutions of the embodiments of the present invention, it will give a brief description to the figures of the embodiments below. Obviously, the below described figures are only relate some embodiments of the present invention, and not intended to restrict the present invention.

DETAILED DESCRIPTION

To describe the technical solutions of the embodiments of the present invention more clearly, the following will give a brief introduction on the figures of the embodiments. Obviously, the figures in the following description only relate to some embodiments of the present invention, and are not intend to limit the present invention.

With respect to the problem that the 3D displaying modes in the prior art are only suitable for a transmissive liquid crystal display panel and the reflective type liquid crystal display panel is relatively difficult to achieve a 3D displaying, the embodiments of the present invention provide a reflective type naked-eye 3D display apparatus and manufacturing method thereof, which can achieve a naked-eye type 3D displaying on the reflective type liquid crystal display panel.

Figure 1:
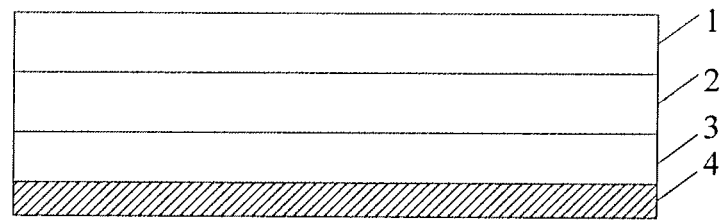
FIG. 1 is a structural schematic view of a reflective type naked-eye 3D display apparatus of an embodiment of the present invention.

FIG. 1 is a structural schematic view of a reflective type naked-eye 3D display apparatus of an embodiment of the present invention. As shown in FIG. 1, the present embodiment comprises:

a liquid crystal display panel 2.

Further, the reflective type naked-eye 3D display apparatus further comprises:

a polarizing filter structure 1 disposed on the liquid crystal display panel 2, the polarizing filter structure 1 may comprise different regions where linear polarizing lights of different polarizing states are transmitted;

a reflective layer structure 3 disposed under the liquid crystal display panel 2, the reflective layer structure 3 may comprise different regions where linear polarizing light of a preset direction is reflected or transmitted.

Further, as shown in FIG. 1, the reflective type naked-eye 3D display apparatus further comprises:

a light absorbing layer 4 disposed under the reflective layer structure 3 and used to absorb the light which might be leaked out from the reflective layer structure 3.

The embodiment of the present invention may achieve a naked-eye type 3D displaying on the reflective type liquid crystal display panel by controlling the effect of the polarizing filter structure.

A detailed description on the reflective type naked-eye 3D display apparatus of the present invention will be given as follows by combining with the detailed implementing manners of the various structures.

To achieve naked-eye type 3D displaying on the reflective type liquid crystal display panel, it needs to cause the environmental light to be able to be incident on all the regions of the liquid crystal display panel 2, and the reflected light may be absorbed in the light blocking bar region, and it would normally emit at the grating opening, so as to achieve the reflective type 3D displaying. That is, it is required that in the light-blocking bar region of the reflective naked-eye 3D display apparatus, the environmental light can enter but can not emit; however, at the grating opening of the reflective type naked-eye 3D display apparatus, the environmental light can enter and emit, so as to achieve the naked-eye 3D displaying.

Figure 2A:
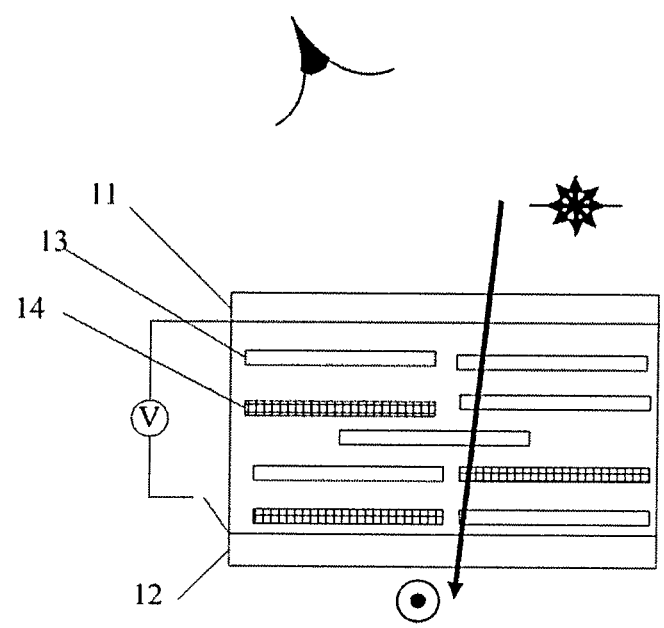
FIGS. 2a-2b are schematic views of a polarizing filter structure of the embodiment of the present invention.
Figure 2B:
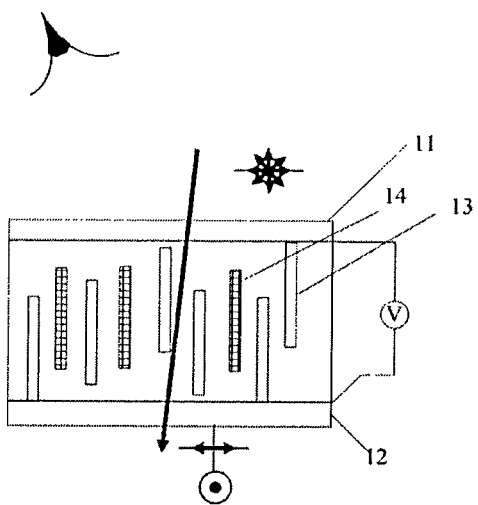

FIGS. 2a-2b are schematic views of the polarizing filter structure of the embodiment of the present invention. The polarizing filter structure 1 may comprise different regions where lights of different polarizing states are transmitted, so as to achieve the functions of the grating light-blocking bar and the grating opening. It is to be noted that the grating light-blocking bar may cause the incident environmental light to be able to be incident inside but unable to be reflected out.

As shown in FIGS. 2a-2b, the polarizing filter structure 1 comprises:

a first substrate 11 and a second substrate 12 disposed to be opposite to each other;

liquid crystal molecules between the first substrate 11 and the second substrate 12 and formed of a Nematic phase liquid crystal 13 and a dichromatism dye 14, the original orientation of the liquid crystal molecules is parallel to the first substrate 11, and after applying an electric field to the structure shown in FIGS. 2a and 2b, the orientation of the liquid crystal molecules is vertical to the first substrate 11.

For example, the polarizing filter structure 1 comprises at least one first region (a structure shown in FIG. 2a) and at least one second region (a structure shown in FIG. 2b), the orientation of the liquid crystal molecules of the first region is parallel to the first substrate, for the natural light incident into the first region, the light vibrating direction of one component thereof is parallel to the director of the liquid crystal molecule so that it would be absorbed, and only another polarizing component may enter, so the first region may transmit linear polarizing light vertical to the director of the liquid crystal molecule, and functions as the grating light-blocking bar; while the orientation of the liquid crystal molecules of the second region is vertical to the first substrate, and is aligned along the electric field, and the polarizing light of the two directions can both pass at this time, so the second region may transmit the linear polarizing light parallel or vertical to the director of the liquid crystal molecule and function as the grating opening. Each sub pixel comprises one said first region and one said second region.

The dichromatism dye is added into the liquid crystal material, and such dichromatism dye has the following features: for two linear polarizing light components orthogonal to each other of the incident light, it selectively absorbs only one of them and let the other one pass. The original orientation of the liquid crystal molecules between the substrates is parallel or anti-parallel in up and down directions, and is parallel to or vertical to the polarizing direction of the incident polarizing light passed the substrate. As shown in FIG. 2a, as to the incident natural light, one component thereof has a light vibrating direction parallel to the director of the liquid crystal molecule and is absorbed, and only the other polarizing component enters, so the region shown in FIG. 2a will function as the grating light-blocking bar (i.e. the said first region); while when a voltage is applied on the polarizing filter structure 1 comprising at least one first region and at least one second region, as shown in FIG. 2b, the liquid crystal molecules are aligned along the direction of the electric field, and at this time, the polarizing lights in both directions can pass, so the region shown in FIG. 2b will function as the grating opening (i.e. the above second region).

Figure 3A:
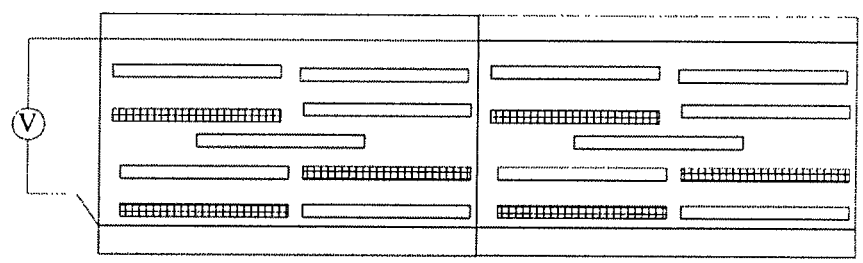
FIGS. 3a-3b are schematic views of a liquid crystal display panel of the embodiment of the present invention.
Figure 3B:
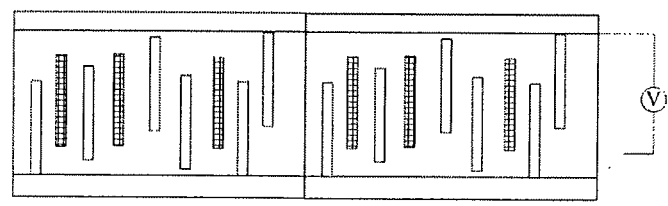

FIGS. 3a-3b are schematic views of the liquid crystal display panel of the embodiment of the present invention. The liquid crystal display panel comprises two substrates (upper and bottom substrates) disposed to be opposite to each other and a liquid crystal layer between the two substrates. FIG. 3a achieves a black state displaying of the image, and FIG. 3b achieves a white state displaying of the image.

Figure 4:
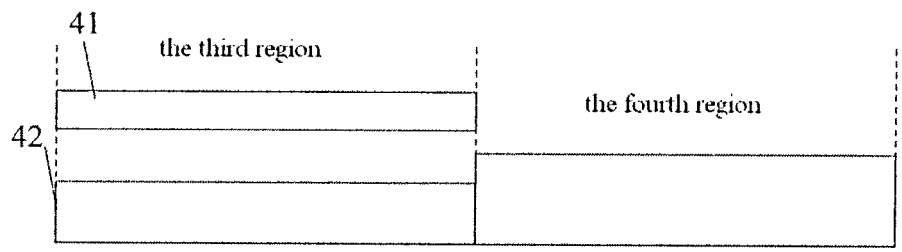
FIG. 4 is a schematic view of a reflective layer structure of the embodiment of the present invention.

FIG. 4 is a schematic view of the reflective layer structure of the embodiment of the present invention. As shown in FIG. 4, the reflective layer structure 3 comprises at least one third region and at least one fourth region, and each sub pixel comprises one third region and one fourth region, and the reflective layer structure of the third region is constituted by a ¼ wave plate 41 and a reflective plate 42, the reflective plate 42 may use a common reflective plate, and the reflective layer structure of the third region may achieve inter-conversion of the orthogonal linear polarizing lights; the reflective layer structure of the fourth region is a polarizing selectively reflective plate, and may reflect the linear polarizing light of the preset direction and transmit the linear polarizing light perpendicular to the preset direction.

Figure 5:
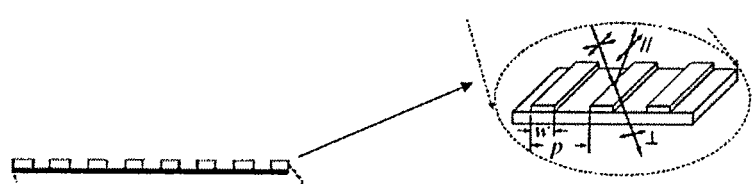
FIG. 5 is a schematic view of a reflective layer structure using a nano-scale silicon wafer level package board of the embodiment of the present invention.
Figure 6:
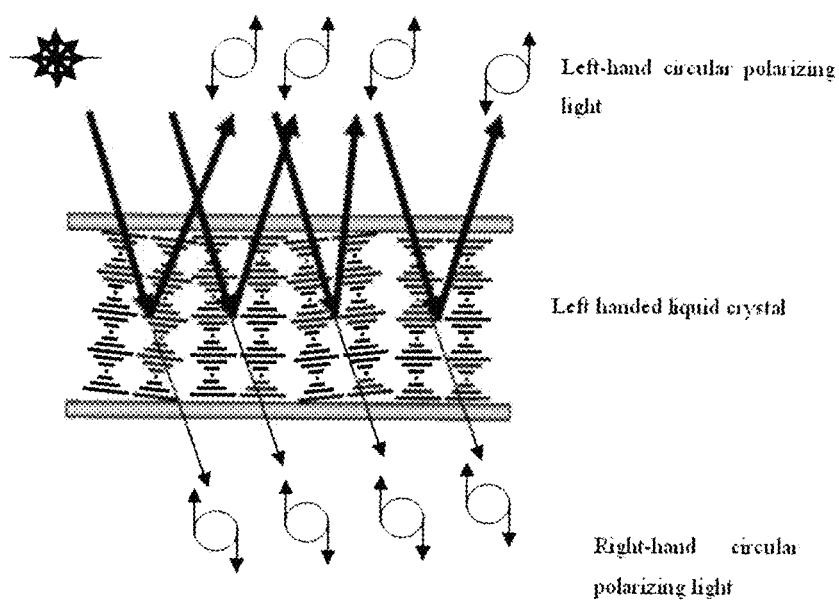
FIG. 6 is a schematic view of a reflective layer structure using cholesteric phase liquid crystal display panel of the embodiment of the present invention.

The reflective layer structure of the fourth region may be achieved by the following several manners:

(1) the fourth region of the reflective layer structure comprises a nano-scale wire grid polarizer (WLP), and as shown in FIG. 5, the nano-scale WLP plate may reflect the polarizing light vibrating along the direction of nano metal ribs, and transmit the polarizing light vertical to it, so as to achieve the selective reflection of the polarizing light;

(2) the fourth region of the reflective layer structure comprises a cholesteric phase liquid crystal display panel, and as shown in FIG. 6, the cholesteric phase liquid crystal display panel uses left-handed liquid crystal (it may be achieved by adding left handed chiral compound and Nematic phase liquid crystal) as an example, performs parallel alignment, and achieves a planar texture; as shown in FIG. 6, a portion of the incident light is Bragg reflected, and the reflected light is left-hand circular polarizing light, while the right-hand circular polarizing light is transmitted, so as to achieve a selective reflection;

(3) the fourth region of the reflective layer structure comprises a 3M selectively reflective film, which reflects the linear polarizing light of a preset direction and transmit the linear polarizing light perpendicular to the preset direction, so as to achieve a selective reflection of the polarizing light.

The light absorbing layer 4 is a black light-absorbing layer, and may use black organic material, black inorganic material or black metal, to absorb the transmitted light of the reflective layer structure 3, and prevent the crosstalk of the light which might influence the 3D displaying effect.

Figure 7:
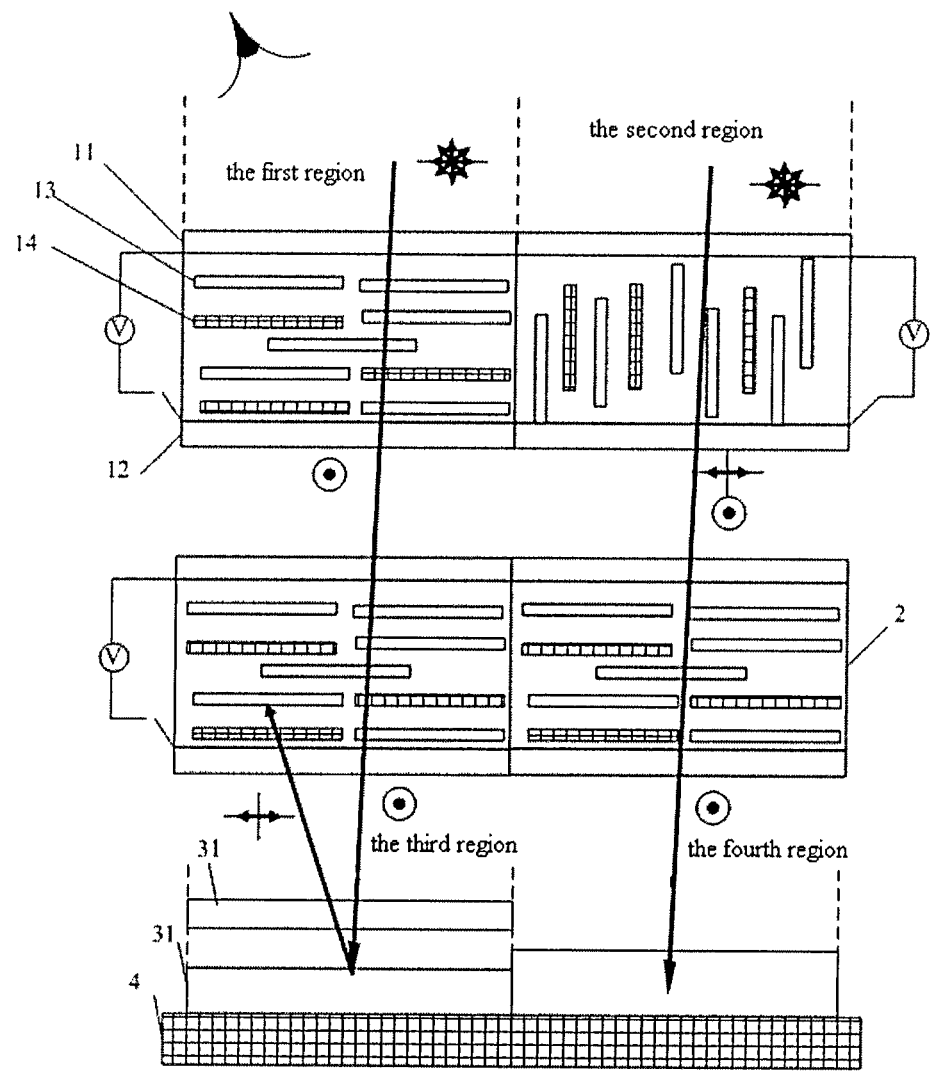
FIG. 7 is a schematic view of the light of the reflective type naked-eye 3D display apparatus of an embodiment of the present invention when the pixel of the liquid crystal display panel displays black.
Figure 8:
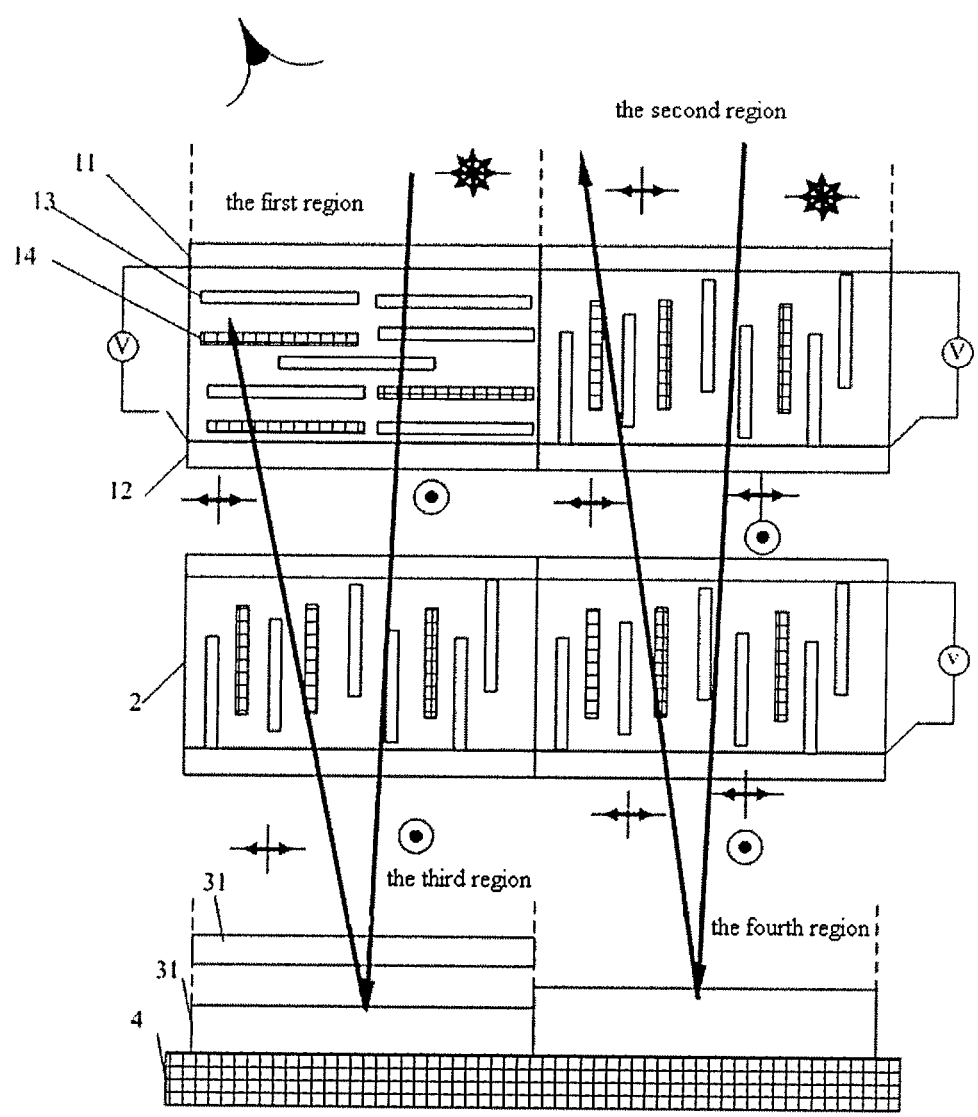
FIG. 8 is a schematic view of the light of the reflective type naked-eye 3D display apparatus of an embodiment of the present invention when the pixel of the liquid crystal display panel displays bright.

The naked-eye 3D displaying of the reflective type liquid crystal display panel may be achieved by the interaction of the four-layer structure of the polarizing filter structure 1, the liquid crystal display panel 2, the reflective layer structure 3 and the light absorbing layer 4 and so on. As shown in FIGS. 7 and 8, each sub pixel of the reflective type naked-eye 3D display apparatus comprises one first region and one second region of the polarizing filter structure 1, two displaying units of the liquid crystal display panel, and further comprises one third region and one fourth region of the reflective layer structure. In one sub pixel, the first region of the polarizing filter structure 1 is disposed to correspond to one displaying unit of the liquid crystal display panel and the third region of the reflective layer structure, and the second region of the polarizing filter structure 1 is disposed to correspond to another displaying unit of the liquid crystal display panel and the fourth region of the reflective layer structure. The displaying principle of the reflective type naked-eye 3D display apparatus is as follows:

When the pixel of the liquid crystal display panel 2 displays black, its implementation manner is as shown in FIG. 7, and the light path of the natural light (i.e. incident light) after passing the polarizing filter structure 1 are analyzed by dividing into two regions (left and right regions): the left region (i.e. the first region of the polarizing filter structure 1) is a region of grating light-blocking bar, after the left incident light passes the first region of the polarizing filter structure 1, the vibration direction of the polarized light is (i.e. perpendicular to the liquid crystal display panel), and the vibration direction of the polarized light does not change after passing the liquid crystal display panel 2, while after passing the third region of the reflective layer structure 3, the vibration direction of the reflected light of the polarized light is ⟷ (i.e. parallel to the liquid crystal display panel), and when the reflected light passes the liquid crystal display panel 2 again, it is absorbed by the dichromatism dye of the same direction, and thus it may achieve black displaying; while the right region (the second region of the polarizing filter structure 1) is a grating opening region, and after the natural light (i.e. the incident light) passes the second region of the polarizing filter structure 1, the incident light is still natural light, and after it passes the liquid crystal display panel 2, the vibration direction of the incident light is, and the fourth region of the reflective layer structure 3 (i.e. the polarizing selective reflecting plate) reflects linear polarizing light in direction of ⟷, and transmits linear polarizing light tin direction of ⊙, thus the incident light is transmitted from the fourth region of the reflective layer structure 3 and is absorbed by the black light absorbing layer 4, so as to display black.

When the pixel of the liquid crystal display panel 2 displays in a bright state, its implementation manner is as shown in FIG. 8, and the light path of the natural light (i.e. incident light) after passing the polarizing filter structure 1 is analyzed by dividing into two regions (left and right regions): the left region (i.e. the first region of the polarizing filter structure 1) is a region of grating light-blocking bar, after the left incident light passes the first region of the polarizing filter structure 1, the vibration direction of the polarized light is (i.e. perpendicular to the liquid crystal display panel), and the vibration direction of the polarized light does not change after passing the liquid crystal display panel 2, while after passing the third region of the reflective layer structure 3, the vibration direction of the reflected light of the polarized light is ⟷ (i.e. parallel to the liquid crystal display panel), and when the reflected light passes the liquid crystal display panel 2 again, it may be transmitted, and it is absorbed when passing the region of grating light-blocking bar (i.e. the first region of the polarizing filter structure 1), and it may be transmitted when passing the grating opening region (the second region of the polarizing filter structure 1); while the right region (the second region of the polarizing filter structure 1) is a grating opening region, and after the natural light (i.e. the incident light) passes the second region of the polarizing filter structure 1, the incident light is still natural light, and after it passes the liquid crystal display panel 2, the incident light is still natural light, but after passing the fourth region of the reflective layer structure 3 (i.e. the polarizing selectively-reflective plate), the direction of the reflected linear polarizing light is ↔, and the direction of the transmitted linear polarizing light is ⊙, and is absorbed by the black light absorbing layer 4. The reflected light ↔ may pass through the liquid crystal display panel 2, and it is absorbed when passing the region of grating light-blocking bar (i.e. the first region of the polarizing filter structure 1), and it may emit when passing the grating opening region (i.e. the second region of the polarizing filter structure 1), and is seen by human eyes, so as to achieve the reflective type naked-eye 3D displaying.

Figure 9:
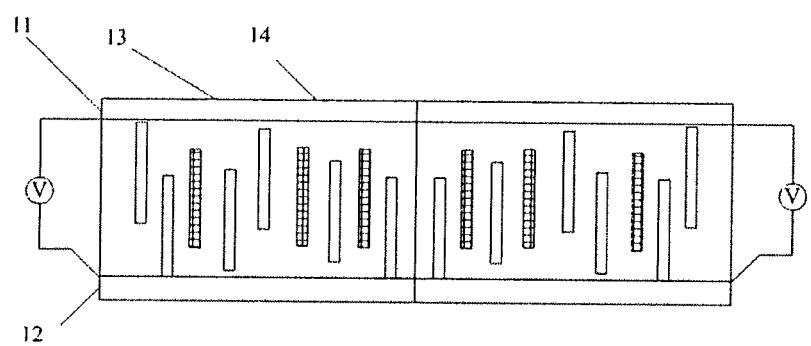
FIG. 9 is a schematic view of the reflective layer structure when the reflective type naked-eye 3D display apparatus of the embodiment of the present invention performs 2D displaying.

Further, the reflective type naked-eye 3D display apparatus of the present invention may perform a 2D displaying, and when it is switched for a 3D displaying mode to a 2D displaying mode, it only needs to adjust the circuit driving of the polarizing filter structure 1, and change the polarizing filter structure 1 to be the structure shown in FIG. 9. Such structure removes the grating function by transmitting light being reflected or incident, to achieve a 2D displaying effect.

On another aspect of the embodiments of the present invention, an embodiment of the present invention further provides a method of manufacturing a reflective type naked-eye 3D display apparatus corresponding to the above reflective type naked-eye 3D display apparatus, comprising:

forming a liquid crystal display panel;

forming a polarizing filter structure on the liquid crystal display panel, the above polarizing filter structure may comprise different regions where linear polarizing lights having different polarizing states are transmitted;

forming a reflective layer structure under the liquid crystal display panel, the said reflective layer structure may comprise different regions and linear polarizing light of a preset direction is reflected.

For example, the above manufacturing method further comprises:

forming a light absorbing layer under the said reflective layer structure.

The manufacturing method of a reflective type naked-eye 3D display apparatus of the present invention forms a polarizing filter structure on the liquid crystal display panel and forms a reflective layer structure under the liquid crystal display panel, the polarizing filter structure may comprise different regions where linear polarizing lights having different polarizing states are transmitted, and the reflective layer structure may comprise different regions and linear polarizing light having preset direction is reflected. By controlling the effect of the polarizing filter structure, it may achieve a naked-eye type 3D displaying on the reflective type liquid crystal display panel.

All implementation means and applied situations in the above apparatuses are applicable to the embodiments of the method, and can also achieve the same technical functional effects, so the same description is not repeated here.

In the various method embodiments of the present invention, the sequence numbers of the steps are not used to define the sequence, and those skilled in the art can understand, without paying creative work, variation of the sequence of the steps are within the protection scope of the present invention.

The foregoing is the exemplary embodiments of the present invention, and is not intended to define the protection scope of the present invention, the scope of which is determined by the appended claims.

What is claimed is:

1. A reflective type naked-eye 3D display apparatus, comprising:
    a liquid crystal display panel;
    wherein the reflective naked-eye 3D display apparatus further comprises:
    a polarizing filter structure disposed on the liquid crystal display panel, wherein the polarizing filter structure comprises different regions where linear polarizing lights having different polarizing states are transmitted; and
    a reflective layer structure disposed under the liquid crystal display panel, wherein the reflective layer structure comprises different regions where linear polarizing light of a preset direction is reflected or transmitted,
    wherein the reflective layer structure further comprises at least one third region and at least one fourth region, and each sub pixel comprises one third region and one fourth region, the third region of the reflective layer structure is constituted by a ¼ wave plate and a reflective plate; the fourth region of the reflective layer structure reflects the linear polarizing light of the preset direction and transmits the linear polarizing light perpendicular to the preset direction.

2. The reflective type naked-eye 3D display apparatus according to claim 1, wherein the reflective naked-eye 3D display apparatus further comprises:
    a light absorbing layer disposed under the reflective layer structure.

3. The reflective type naked-eye 3D display apparatus according to claim 2, wherein the polarizing filter structure comprises:
    a first substrate and a second substrate disposed to be opposite to each other; and
    liquid crystal molecules between the first substrate and the second substrate and formed of a Nematic phase liquid crystal and a dichromatism dye, wherein an original orientation of the liquid crystal molecules is parallel to the first substrate, and after applying an electric field to the polarizing filter structure, the orientation of the liquid crystal molecules is vertical to the first substrate.

4. The reflective type naked-eye 3D display apparatus according to claim 1, wherein the light absorbing layer comprises black organic material, black inorganic material or black metal.

5. The reflective type naked-eye 3D display apparatus according to claim 4, wherein the polarizing filter structure comprises:
    a first substrate and a second substrate disposed to be opposite to each other; and
    liquid crystal molecules between the first substrate and the second substrate and formed of a Nematic phase liquid crystal and a dichromatism dye, wherein an original orientation of the liquid crystal molecules is parallel to the first substrate, and after applying an electric field to the polarizing filter structure, the orientation of the liquid crystal molecules is vertical to the first substrate.

6. The reflective type naked-eye 3D display apparatus according to claim 5, wherein the polarizing filter structure comprises at least one first region and at least one second region, and each sub pixel comprises one first region and one second region, the orientation of the liquid crystal molecules of the first region is parallel to the first substrate, and the orientation of the liquid crystal molecules of the second region is vertical to the first substrate.

7. The reflective type naked-eye 3D display apparatus according to claim 1, wherein the polarizing filter structure comprises:
   a first substrate and a second substrate disposed to be opposite to each other; and
   liquid crystal molecules between the first substrate and the second substrate and formed of a Nematic phase liquid crystal and a dichromatism dye, wherein an original orientation of the liquid crystal molecules is parallel to the first substrate, and after applying an electric field to the polarizing filter structure, the orientation of the liquid crystal molecules is vertical to the first substrate.

8. The reflective type naked-eye 3D display apparatus according to claim 7, wherein the polarizing filter structure comprises at least one first region and at least one second region, and each sub pixel comprises one first region and one second region, the orientation of the liquid crystal molecules of the first region is parallel to the first substrate, and the orientation of the liquid crystal molecules of the second region is vertical to the first substrate.

9. The reflective type naked-eye 3D display apparatus according to claim 1, wherein the fourth region of the reflective layer structure comprises a nano-scale wire grid polarizer; or
   the fourth region of the reflective layer structure comprises a cholesteric phase liquid crystal display panel; or
   the fourth region of the reflective layer structure comprises a 3M selectively reflective film.

10. A manufacturing method of manufacturing a reflective type naked-eye 3D display apparatus, comprising:
   forming a liquid crystal display panel;
   the manufacturing method further comprises:
   forming a polarizing filter structure on the liquid crystal display panel, wherein the polarizing filter structure comprises different regions where linear polarizing lights having different polarizing states are transmitted; and
   forming a reflective layer structure under the liquid crystal display panel, wherein the reflective layer structure comprises different regions and linear polarizing light of a preset direction is reflected, and wherein the reflective layer structure further comprises at least one third region and at least one fourth region, and each sub pixel comprises one third region and one fourth region, the third region of the reflective layer structure is constituted by a ¼ wave plate and a reflective plate; the fourth region of the reflective layer structure reflects the linear polarizing light of the preset direction and transmits the linear polarizing light perpendicular to the preset direction.

11. The manufacturing method of the reflective type naked-eye 3D display apparatus of claim 10, wherein the manufacturing method further comprises:
   forming a light absorbing layer under the reflective layer structure.

12. A reflective type naked-eye 3D display apparatus, comprising:
   a liquid crystal display panel;
   wherein the reflective naked-eye 3D display apparatus further comprises:
   a polarizing filter structure disposed on the liquid crystal display panel, wherein the polarizing filter structure comprises different regions where linear polarizing lights having different polarizing states are transmitted; and
   a reflective layer structure disposed under the liquid crystal display panel, wherein the reflective layer structure comprises different regions where linear polarizing light of a preset direction is reflected or transmitted, and the reflective layer structure covers an entire surface of the liquid crystal display panel;
   wherein the reflective layer structure comprises at least one third region and at least one fourth region, and each sub pixel comprises one third region and one fourth region, the third region of the reflective layer structure is constituted by a ¼ wave plate and a reflective plate; the fourth region of the reflective layer structure reflects the linear polarizing light of the preset direction and transmits the linear polarizing light perpendicular to the preset direction.

13. The reflective type naked-eye 3D display apparatus according to claim 12, wherein the reflective naked-eye 3D display apparatus further comprises:
   a light absorbing layer disposed under the reflective layer structure.

14. The reflective type naked-eye 3D display apparatus according to claim 12, wherein the light absorbing layer comprises black organic material, black inorganic material or black metal.

15. The reflective type naked-eye 3D display apparatus according to claim 12, wherein the polarizing filter structure comprises:
   a first substrate and a second substrate disposed to be opposite to each other; and
   liquid crystal molecules between the first substrate and the second substrate and formed of a Nematic phase liquid crystal and a dichromatism dye, wherein an original orientation of the liquid crystal molecules is parallel to the first substrate, and after applying an electric field to the polarizing filter structure, the orientation of the liquid crystal molecules is vertical to the first substrate.

16. The reflective type naked-eye 3D display apparatus according to claim 15, wherein the polarizing filter structure comprises at least one first region and at least one second region, and each sub pixel comprises one first region and one second region, the orientation of the liquid crystal molecules of the first region is parallel to the first substrate, and the orientation of the liquid crystal molecules of the second region is vertical to the first substrate.

17. The reflective type naked-eye 3D display apparatus according to claim 12, wherein the fourth region of the reflective layer structure comprises a nano-scale wire grid polarizer; or
   the fourth region of the reflective layer structure comprises a cholesteric phase liquid crystal display panel; or
   the fourth region of the reflective layer structure comprises a 3M selectively reflective film.

* * * * *